June 23, 1936.  G. DOUTHWAITE  2,045,180

SOUND SYSTEM

Filed Aug. 9, 1935  2 Sheets-Sheet 2

INVENTOR.
Guy Douthwaite
BY Lyon & Lyon
ATTORNEYS

Patented June 23, 1936

2,045,180

UNITED STATES PATENT OFFICE 2,045,180

SOUND SYSTEM

Guy Douthwaite, Los Angeles, Calif.

Application August 9, 1935, Serial No. 35,478

6 Claims. (Cl. 181—30)

This invention relates broadly to systems for electrically reproducing sound over large areas and more particularly to the production of sound in open air "drive-in" motion picture theatres and the like, in which the patrons sit in their automobiles while viewing and listening to the program.

A general object of the invention is to improve the quality and volume of sound conveyed to the occupants of automobiles in open air theatres and at the same time reduce the volume of sound projected beyond the limits of the theatre field.

"Drive-in" theatres for the exhibition of motion pictures comprise a screen of large dimensions, usually positioned at a substantial height above the ground, with parking ramps positioned in front of the screen in arc-shaped rows, the ramps being so inclined as to give the occupants of automobiles parked thereon a clear view of the screen through the windshields of the automobiles.

To the best of my knowledge, sound projection in "drive-in" theatres has heretofore been effected in the same general manner as in conventional movie houses, namely, by positioning loud speakers back of or around the screen. This method was probably adopted because it was thought necessary in order to produce the illusion that the sound was coming from the players on the screen. It has the serious disadvantage that in cool weather when the patrons have their automobile windows closed, the amplitude of the sound projected from the screen must be so great in order to be heard satisfactorily within the automobiles and it spreads far beyond the limits of the field and may become a nuisance to surrounding residents. Another disadvantage is that because of the great depth of the field and the time required for sound to travel, the sound as heard from some parts of the field may be out of synchronism with the picture on the screen. Still another disadvantage is that because of the depth of the field the amplitude of the sound may be objectionably greater in the front rows than in the back rows.

Offhand, it would appear that the only effective method of overcoming the first objectionable feature would be to provide individual portable speakers adapted to be inserted one within each automobile, since modern automobile bodies are insulated to a greater or less extent against heat and sound.

In accordance with the present invention, however, I have discovered that all of the foregoing objectionable features of central speakers located adjacent the screen may be overcome without providing speakers within the automobiles, by mounting individual speakers on the parking ramps in front of the automobiles so that each speaker is positioned close to and directs its sound through the radiator of the adjacent automobile. Despite expectations that the dash insulation in most automobiles would seriously interfere with the transmission of the sound to the interior of the body, it has been found that with my system a satisfactory level of sound may be introduced within closed automobile bodies without raising the level of sound exterior of the automobiles to a value objectionably loud beyond the confines of the field. I have also found that my system gives perfect sound synchronization with the picture over the entire field and produces perfectly the illusion that the sound is coming from the screen. I also find that the quality of the sound as heard within closed automobiles is excellent and compares favorably with that of the best theatre houses.

A specific application of the invention will now be described with reference to the drawings, in which Fig. 1 is a plan view of a "drive-in" theatre in accordance with the invention;

Figure 1:
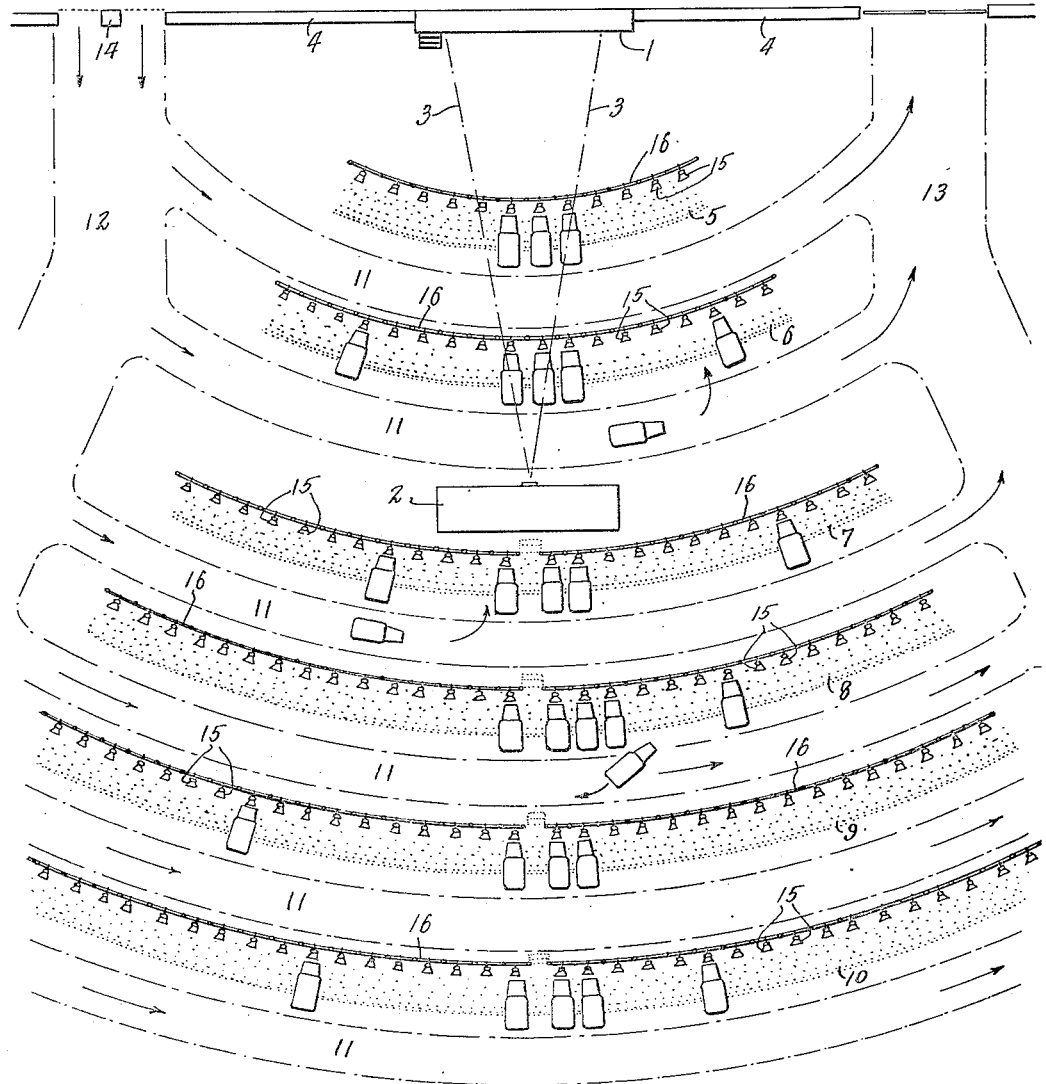

Referring to Fig. 1, a "drive-in" theatre equipped in accordance with the invention comprises a screen 1, upon which pictures are projected from a control room 2 positioned a convenient distance in front thereof, the margins of the projected beam being indicated by the dotted lines 3. Walls 4 may be provided on each side of the screen 1 to block distant lights that might distract attention from the screen. Positioned in front of the screen are a plurality of rows of automobile parking ramps 5, 6, 7, 8, 9, and 10, respectively. Each row of ramps is curved in the form of an arc so that all portions thereof are substantially equidistant from the screen 1 and the front portion of each ramp is elevated sufficiently so that an automobile parked thereon will be inclined at such an angle as to give its occupants a clear view of the screen 1. Of course, the ramps 5 and 6 are sufficiently low with respect to the height of the control room 2 that cars parked on those ramps do not interfere with the projection of the picture.

Positioned back of each ramp 5 to 10, respectively, is a driveway 11 to permit automobiles to reach the ramps. Each driveway 11 communicates at its opposite ends with main driveways 12 and 13. To prevent confusion one of the driveways, for instance driveway 12, is made an entry driveway and the other driveway an exit. The ticket office 14 may be positioned at the end of the driveway 12.

For the transmission of the sound accompaniment to the picture to the occupants of the automobiles, a plurality of loud speakers 15 are positioned on the ramps, each speaker being mounted in such position as to be close to and point directly into the radiator of an automobile parked on the ramp. All of the speakers are connected to the source of sound in the control room 2 in accordance with established practice.

For convenience in mounting the speakers, I prefer to provide a supporting rail 16 along the front edge of each parking ramp, this rail preferably being constructed of pipe so that it will serve as a conduit for the wiring to the speakers.

Figure 2:
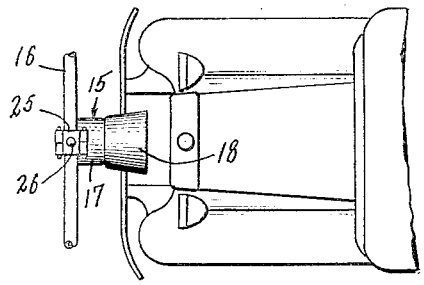
Fig. 2 is a detail plan view showing one speaker unit and its position relative to its associated automobile.
Figure 3:
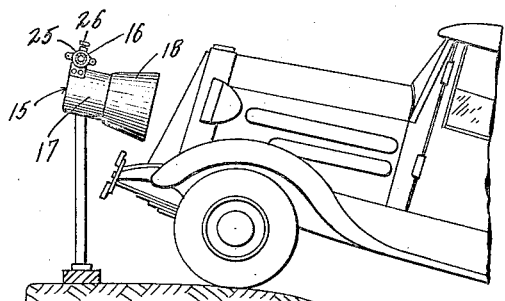
Fig. 3 is a detail elevation view of a speaker and the front end of an automobile positioned adjacent thereto.
Figure 4:
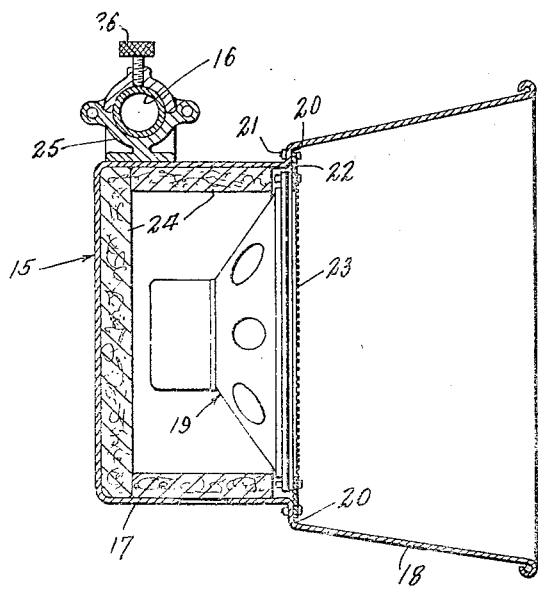
Fig. 4 is a longitudinal sectional view through one of the speakers.

Referring now to Figs. 2, 3 and 4, it will be observed that each speaker 15 comprises a metallic case having a rear enclosed portion 17 and a front horn-like portion 18 open at the forward end. A speaker unit 19 of conventional design is mounted within the portion 17 of the case, the unit being provided with a diaphragm that substantially completely fills the forward end of the case portion 17. At the juncture of portion 17 with the horn portion 18, a shoulder 20 is provided, to which is attached, as by means of screws 21, a ring 22, to which the unit 19 is attached. The diaphragm of the unit 19 extends substantially to the ring 20 so that escape of sound from the rear of the diaphragm to the front thereof is prevented. A protective covering 23 of silk, gauze or other material capable of protecting the unit 19 from the weather, while permitting transmission of sound thereto, is also mounted on the ring 22.

Since the case portion 17 is closed, it is desirable in order to prevent sound reflections therewithin to line this portion with sound absorbent material 24 which may be hair felt. The horn portion 18 of the speaker case tends to confine the sound issuing from the unit 19 and direct it straight ahead through the radiator of an automobile parked in front thereof, as shown in Figs. 2 and 3.

The case portion 17 of each speaker is provided with a clamp 25 adapted to encircle one of the rails 16 and engage the latter loosely. The clamp may be locked firmly on the rail by means of a set screw 26. This permits parking attendants to shift speakers along the rails and rotate them about the rails to accurately align each speaker with its associated automobile.

The complete enclosure of the rear side of the diaphragm of each speaker unit by the casing 17, lined with sound absorbent material 24, aids greatly in maintaining the sound level throughout the field at a desirable low level while maintaining a suitable sound level within the automobiles.

Although the invention has been described with particular reference to an open air motion picture theatre, it is obvious that it has equal application in other types of open air theatres or assembly places in which the patrons sit in their automobiles while listening to desired sounds. Thus it is equally well adapted for a public address system or a radio entertainment system, in which the sound currents, regardless of their origin, would be applied to the speakers 15 positioned adjacent the different automobiles. It is therefore to be understood that where reference is made in the claims to open air theatres the expression is not to be limited to a particular motion picture theatre of the type disclosed in the drawings.

I claim:

1. In a drive-in theatre in which patrons sit in automobiles parked in front of and facing a stage or screen, means for conveying sounds to the occupants of the automobiles comprising individual loud speakers for the respective automobiles, each speaker being positioned directly in front of and closely adjacent the radiator of its associated automobile, means for producing electric currents corresponding to the sound to be conveyed, and circuit means interconnecting said last mentioned means and said speakers whereby each speaker is energized to generate said sound and direct it through the radiator of the automobile adjacent thereto.

2. A system as described in claim 1, with adjustable mounting means for each speaker, whereby each speaker may be individually shifted to direct sound through the radiator of an automobile parked adjacent to that speaker.

3. A system as described in claim 1, in which the speakers are directive, with means for so positioning each speaker as to direct its sound through the radiator of the automobile adjacent thereto.

4. A system as described in claim 1, in which each speaker comprises a sound reproducing diaphragm mounted in a casing completely enclosing the space on one side of said diaphragm and presenting to said one side of the diaphragm a sound absorbent surface, the casing on the other side of said diaphragm being expanded to constitute a horn, and means for mounting each speaker with its horn directed toward the radiator of an automobile parked adjacent thereto.

5. The method of conveying sound to the passenger compartment of an automobile which comprises generating the sound immediately in front of the radiator of the automobile and directing the sound through the radiator of the automobile.

6. A system for conveying sound to the passenger compartment of an automobile from a distant point comprising a loud speaker positioned immediately in front of the radiator of the automobile and directed toward the radiator of the automobile, means at said distant point for producing electric currents corresponding to the sound to be conveyed, and circuit means interconnecting said last mentioned means and said speaker whereby said speaker is energized to generate sound and direct it through the radiator of the automobile.

GUY DOUTHWAITE.